US009928217B2

(12) United States Patent
Priyadarshini et al.

(10) Patent No.: US 9,928,217 B2
(45) Date of Patent: *Mar. 27, 2018

(54) EFFICIENT HANDLING OF BI-DIRECTIONAL DATA

(71) Applicant: International Business Machines Corporation, Armonk, NY (US)

(72) Inventors: Pallavi Priyadarshini, Bangalore (IN); Parameswara R. Tatini, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/416,233

(22) Filed: Jan. 26, 2017

(65) Prior Publication Data

US 2017/0242827 A1    Aug. 24, 2017

Related U.S. Application Data

(63) Continuation of application No. 15/050,124, filed on Feb. 22, 2016.

(51) Int. Cl.
*G06F 17/30* (2006.01)
*G06F 17/21* (2006.01)
*G06F 17/28* (2006.01)
*H04L 29/06* (2006.01)

(52) U.S. Cl.
CPC .......... *G06F 17/212* (2013.01); *G06F 17/289* (2013.01); *G06F 17/30076* (2013.01); *G06F 17/30569* (2013.01); *H04L 67/42* (2013.01)

(58) Field of Classification Search
CPC .................... G06F 17/30569; G06F 17/30076

USPC ......................................................... 707/756
See application file for complete search history.

(56) References Cited

U.S. PATENT DOCUMENTS

| 6,275,789 | B1 |   8/2001 | Moser et al. |
| 7,086,004 | B2 |   8/2006 | Atkin |
| 7,467,375 | B2 | 12/2008 | Tondreau et al. |
| 8,056,000 | B2 | 11/2011 | Vidyarthi et al. |
| 8,660,835 | B2* |  2/2014 | Mousaad ................ G06F 17/21 704/8 |

(Continued)

OTHER PUBLICATIONS

Ishida, Richard, "Unicode Bidirectional Algorithm basics", W3C, published Apr. 24, 2013, Last substantive update Apr. 24, 2013 15:08 GMT, This version Apr. 17, 2014 17:33 GMT, 5 pages, <http://www.w3.org/International/articles/inline-bidi-markup/uba-basics>.

(Continued)

*Primary Examiner* — Mark E Hershley
(74) *Attorney, Agent, or Firm* — Alexander G. Jochym

(57) ABSTRACT

A tool for standardized layout transformations of BIDI data exchanged between legacy and modern systems is provided. The tool retrieves client connection information from a client request for data. The tool determines, based, at least in part, on the client connection information, a client application's operating system. The tool determines whether the data requested in the client request is BIDI data. Responsive to a determination that the data requested is BIDI data, the tool initiates a layout transformation of the data requested at a single point within the database server. The tool returns transformed BIDI data to the client application.

1 Claim, 3 Drawing Sheets

(56) References Cited

U.S. PATENT DOCUMENTS

| | | | | |
|---|---|---|---|---|
| 9,158,742 B2* | 10/2015 | El-Shishiny | ............ | G06F 17/21 |
| 2001/0034736 A1* | 10/2001 | Eylon | ............... | G06F 17/30067 |
| 2006/0106593 A1* | 5/2006 | Schultz | ................ | G06F 17/212 |
| | | | | 704/5 |
| 2009/0063956 A1* | 3/2009 | Vidyarthi | .......... | G06F 17/30569 |
| | | | | 715/239 |
| 2011/0106524 A1* | 5/2011 | Mousaad | ................ | G06F 17/21 |
| | | | | 704/8 |
| 2011/0107202 A1* | 5/2011 | El-Shishiny | ............ | G06F 17/21 |
| | | | | 715/243 |
| 2012/0109635 A1 | 5/2012 | Winkler | | |
| 2012/0266065 A1* | 10/2012 | El-Shishiny | ............ | G06F 17/21 |
| | | | | 715/264 |
| 2017/0006039 A1* | 1/2017 | Ernohazy | ............. | H04L 63/102 |

OTHER PUBLICATIONS

Mahlin, Tomer, "[review feedback] Visual vs. logical ordering of text", W3 Archives, Received on Tuesday, Mar. 5, 2013 09:56:27 UTC, archive was generated by hypermail 2.3.1 : Tuesday, Jan. 6, 2015 22:04:32 UTC, 3 pages, <http://lists.w3.org/Archives/Public/www-international/2013JanMar/0331.html>.
"Appendix P: List of IBM Patents or Patent Applications Treated As Related", Dated, pp. 1-2.
U.S. Appl. No. 15/050,124, filed Feb. 22, 2016; Entitled "Efficient Handling of Bi-Directional Data".

* cited by examiner

EFFICIENT HANDLING OF BI-DIRECTIONAL DATA

BACKGROUND OF THE INVENTION

The present invention relates generally to data exchange, and more particularly to bi-directional data transformation.

Many languages are written in a left to right direction (LTR). Other languages, commonly referred to as bi-directional languages (BIDI), and are written and read in a right to left direction, such as Arabic and Hebrew. Most computer systems support BIDI.

Some database management systems of legacy systems represent BIDI data in a visual ordering, such that data is stored in the same order as it is displayed. Most modern operating systems represent BIDI data in logical ordering, such that data is stored in the order it is typed. Applications operating on modern operating systems may insert, update, and query data from backend systems operating on legacy systems.

SUMMARY

Aspects of an embodiment of the present invention disclose a method, a computer system, and a computer program product for standardized layout transformations of BIDI data exchanged between legacy and modern systems, in accordance with an embodiment of the present invention. The method includes retrieving, by one or more computer processors, client connection information from a client request for data. The method includes determining, by the one or more computer processors, based, at least in part, on the client connection information, an operating system of a client application, wherein determining includes determining the operating system of the client application through one or more code pages utilized by the client application, where the one or more code pages indicate which modern operating system the client application leverages. The method includes determining, by the one or more computer processors, whether the data requested in the client request is BIDI data, wherein determining includes identifying the data requested and determining whether the data requested exhibits one or more bi-directional properties that indicate BIDI data. The method includes determining, by the one or more computer processors, the data requested is BIDI data where the data requested exhibits layout properties indicative of BIDI data. Responsive to a determination that the data requested is BIDI data, the method includes initiating, by the one or more computer processors, a layout transformation of the data requested at a single point within a database server, wherein initiating includes determining a plurality of data from a connection string of the client request, where the plurality of data indicates a type of bi-directional data transformation. Responsive to the plurality of data from the connection string indicating data being returned to the client application from a database, the method includes converting, by the one or more computer processors, visual data to logical data within the database server. The method includes returning, by the one or more computer processors, transformed BIDI data to the client application.

DETAILED DESCRIPTION

Embodiments of the present invention recognize that with a widespread adoption of BIDI data and a coexistence of both legacy and modern systems in heterogeneous environments, there is a need for a standardized layout transformation (i.e., logical to visual, and visual to logical) when BIDI data is exchanged between legacy and modern systems. Embodiments of the present invention further recognize that, due to BIDI data exchange between legacy and modern systems, where middleware servers operating on a modern operating system fetch data from legacy system mainframes, and combine data from multiple data sources, an application on the modern operating system may not be able to understand the BIDI data received from the database stored in visual order, and as a result, is misinterpreted and displayed incorrectly on the application. Embodiments of the present invention further recognize that, due to BIDI data exchange between legacy and modern systems, BIDI data created on modern systems is stored into a database in an unexpected (e.g., logical) order, and as a result, is processed and displayed incorrectly on a legacy system. Embodiments of the present invention further recognize that, due to BIDI data exchange between legacy and modern systems, data mismatch may occur where data is inserted by applications operating on legacy mainframes and retrieved by applications operating on modern operating systems.

Embodiments of the present invention provide the capability to standardize layout transformation of BIDI data between modern and legacy systems in heterogeneous environments. Embodiments of the present invention provide the capability to introduce a mechanism to perform a standardized automatic layout transformation in a database server operating on a legacy system (e.g., mainframe). Embodiments of the present invention provide the capability for a database server to automatically initiate a layout transformation, for example, convert visual BIDI data to logical BIDI data, and return the transformed BIDI data to a client application.

Implementation of such embodiments may take a variety of forms, and exemplary implementation details are discussed subsequently with reference to the Figures.

Figure 1:
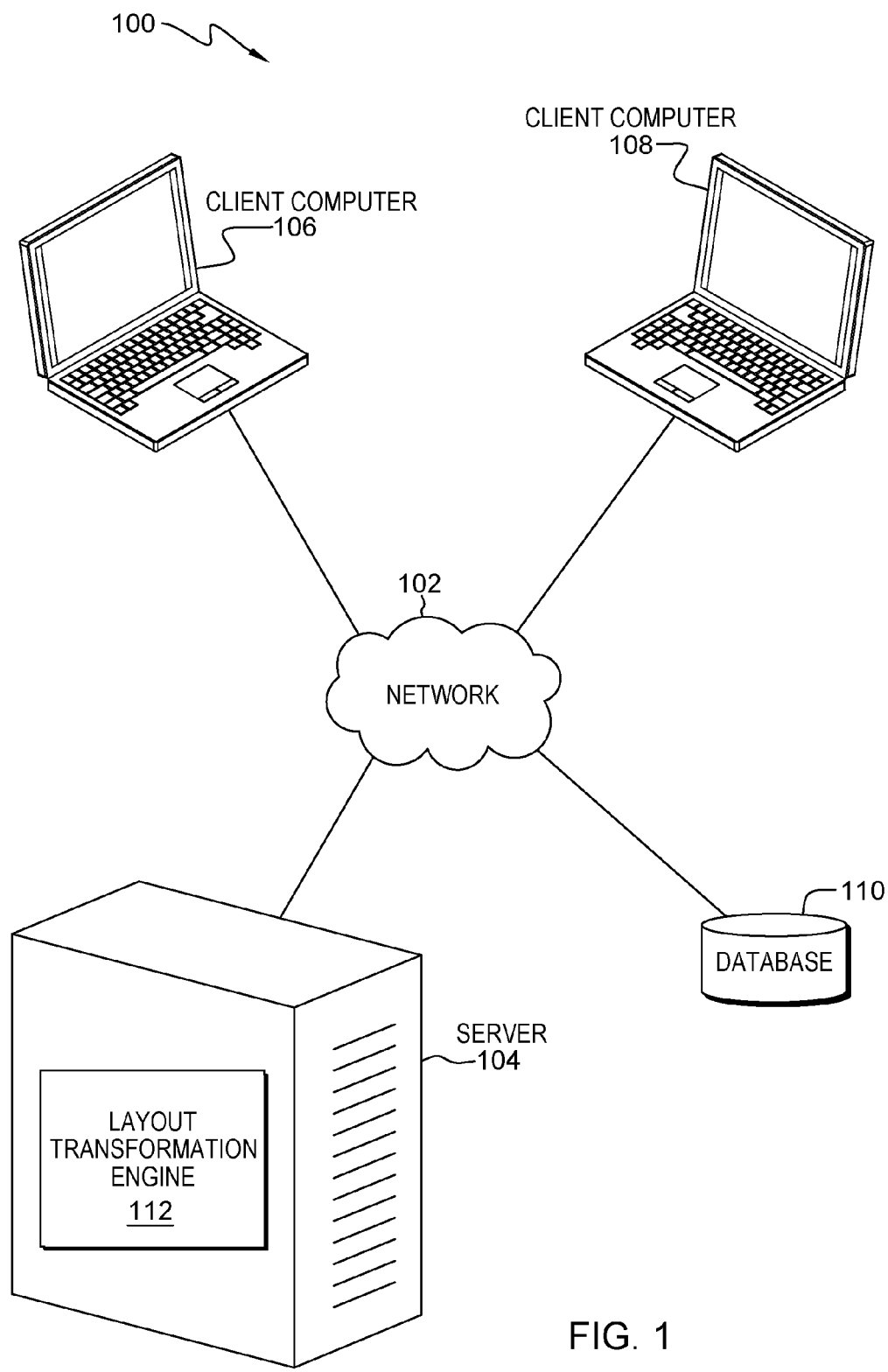
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes network 102, server 104, and one or more client computers, such as client computer 106 and client computer 108, and database 110.

In one embodiment, network 102 is the Internet representing a worldwide collection of networks and gateways that use TCP/IP protocols to communicate with one another. Network 102 may include wire cables, wireless communication links, fiber optic cables, routers, switches, and/or firewalls. Server 104, client computer 106, client computer 108, and database 110 are interconnected by network 102. Network 102 can be any combination of connections and protocols capable of supporting communications between server 104, client computer 106, client computer 108, database 110 and layout transformation engine 112. Network 102 may also be implemented as a number of different types of networks, such as an intranet, a local area network (LAN), a virtual local area network (VLAN), or a wide area network (WAN). FIG. 1 is intended as an example and not as an architectural limitation for the different embodiments.

In one embodiment, server 104 may be, for example, a server computer system, such as a database server, a management server, a web server, or any other electronic device or computing system capable of sending and receiving data. In another embodiment, server 104 may be a data center consisting of a collection of networks and servers providing an IT service, such as virtual servers and applications deployed on virtual servers, to an external party. In one embodiment, server 104 may be a database server operating on a legacy system, such as a mainframe system. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In the exemplary embodiment, server 104 includes layout transformation engine 112 for performing standardized layout transformations of BIDI data exchanged between legacy and modern systems.

In one embodiment, layout transformation engine 112 operates on a central server, such as server 104, and can be utilized by one or more client computers, such as client computer 106 and client computer 108, via network 102. In another embodiment, layout transformation engine 112 may be utilized as a software service provided by a third-party cloud service provider (not shown). In yet another embodiment, layout transformation engine 112 may include one or more software-based components, such as add-ons, plug-ins, and agent programs, etc., installed on one or more client devices, such as client computer 106 and client computer 108, to standardize layout transformations of BIDI data exchanged between legacy and modern systems.

In one embodiment, layout transformation engine 112 is a software-based program for performing automatic standardized layout transformations of BIDI data exchanged between legacy and modern systems. In one embodiment, layout transformation engine 112 provides a mechanism for performing automatic standardized layout transformations of BIDI data in a database server, such as server 104, operating on a legacy system (e.g., mainframes). In one embodiment, layout transformation engine 112 identifies a client application's operating system (e.g., modern operating system) from information retrieved from a client application's connection request information.

In one embodiment, client computer 106 and client computer 108 are clients to server 104 and may be, for example, a server, a desktop computer, a laptop computer, a tablet computer, a personal digital assistant (PDA), a smart phone, a thin client, or any other electronic device or computing system capable of communicating with server 104 through network 102. For example, client computer 106 and client computer 108 may be a laptop computer capable of connecting to a network, such as network 102, to host or participate in a collaborative web meeting and communicate with a central server to utilize a software-based program, such as layout transformation engine 112 of server 104. In one embodiment, client computer 106 and client computer 108 may be any suitable type of client device capable of sending client application connection requests to a database server in a legacy system, and exchanging BIDI data from a modern operating system to a legacy system in a heterogeneous environment. In one embodiment, client computer 106 and client computer 108 include a user interface (not shown) for sending client application connection requests to a database server in a legacy system. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curves of command-line interfaces, which required commands to be typed on the keyboard. The actions in GUIs are often performed through direct manipulation of the graphics elements.

In one embodiment, database 110 is a storage device (e.g., storage repository, database, etc.) interconnected (i.e., ported) on a legacy system platform, such as a mainframe. In one embodiment, database 110 provides the capability to store visual BIDI data.

Figure 2:
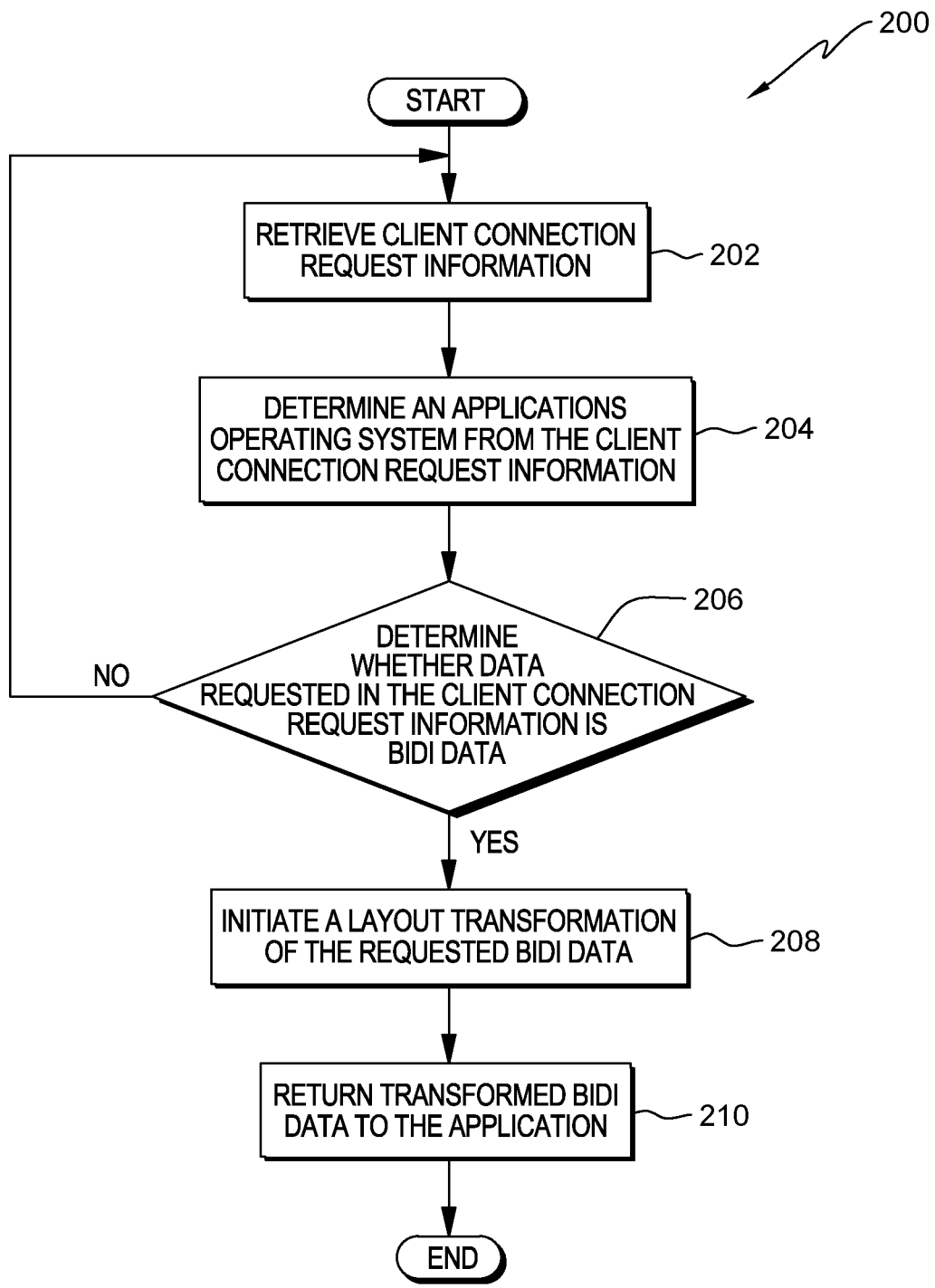
FIG. 2 is a flowchart depicting operational steps of a layout transformation engine, in accordance with an embodiment of the present invention.

FIG. 2 depicts a flowchart of operational steps of a layout transformation engine, such as layout transformation engine 112 of FIG. 1, generally designated 200, for automatic standardized layout transformations of BIDI data exchanged between modern and legacy systems, in accordance with an embodiment of the present invention.

Layout transformation engine 112 retrieves client connection request information (202). In one embodiment, layout transformation engine 112 retrieves client connection request information from a client request for data submitted to a database server, such as server 104, by an application or tool on a client device, such as client computer 106 and client computer 108.

Layout transformation engine 112 determines an application's operating system from the client connection request information (204). In one embodiment, layout transformation engine 112 determines, based, at least in part, on the client connection request information, an operating system that the application is operating on. In one embodiment, layout transformation engine 112 may determine the application's operating system through code pages utilized by the client application, where the code pages indicate which modern operating system the application leverages.

Layout transformation engine 112 determines whether data requested in the client connection request information is BIDI data (206). In one embodiment, layout transformation engine 112 determines whether the data requested is BIDI data by identifying the data requested, and further determining whether the data requested exhibits bi-directional properties, such as layout properties (RTL) known in the art, that indicate BIDI data. Where the requested data exhibits layout properties indicative of BIDI data, layout transformation engine 112 determines that the data requested is BIDI data. Where the requested data does not exhibit layout properties indicative of BIDI data, layout transformation engine 112 determines that the data requested is not BIDI data.

Responsive to a determination that the requested data is not BIDI data (NO branch, 206), layout transformation engine 112 continues to retrieve incoming client connection request information (202).

Responsive to a determination that the requested data is BIDI data (YES branch, 206), layout transformation engine 112 initiates a layout transformation of the requested BIDI data (208). In one embodiment, layout transformation engine 112 initiates a layout transformation of the requested BIDI data at a single point within the database server, such as server 104, by determining a plurality of data from a connection string of the client request, where the plurality of data from the connection string indicates a type of bi-directional data transformation to be completed by the database server, where the type of bi-directional data transformation may be a transformation of visual data to logical data, or a transformation of logical data to visual data. Responsive to the plurality of data from the connection string indicating data being returned to the client application from a database, layout transformation program 112 initiates a layout transformation for the data, converting visual data to logical data within the database server. Responsive to the plurality of data from the connection string indicating data being inserted into the database from the client application, layout transformation program 112 initiates a layout transformation for the data, converting logical data to visual data within the database server. In one embodiment, layout transformation includes converting visual data to logical data within the database server for BIDI data being returned to a client application from a database, such as database 110, and converting logical data to visual data at a single point within the database server for BIDI data being inserted or updated in the database by a client application utilizing a modern operating system.

Layout transformation engine 112 returns transformed BIDI data to the application (210). In one embodiment, layout transformation engine 112 returns the transformed BIDI data to the client application, where the transformed BIDI data may be requested BIDI data converted from a visual data layout to a logical data layout. In another embodiment, layout transformation engine 112 inserts or updates the transformed BIDI data in a database, such as database 110, where the transformed BIDI data may be BIDI data converted from a logical data layout to a visual data layout.

Figure 3:
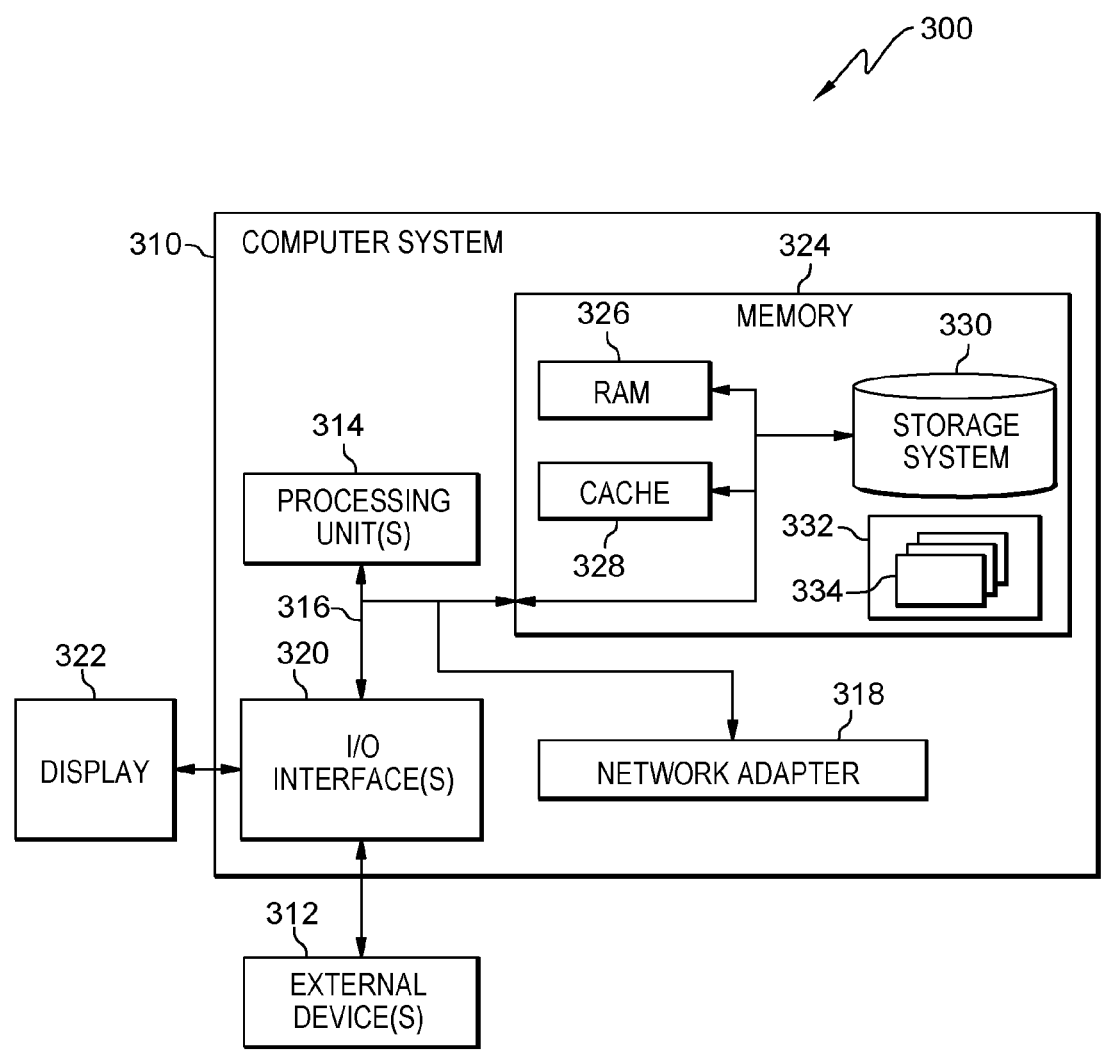
FIG. 3 is a block diagram depicting components of a data processing system (such as the server of FIG. 1), in accordance with an embodiment of the present invention.

FIG. 3 depicts a block diagram of components of data processing system, such as server 104 of FIG. 1, generally designated 300, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 310. The components of computer system 310 may include, but are not limited to, one or more processors or processing unit(s) 314, memory 324, and bus 316 that couples various system components including memory 324 to processing unit(s) 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

Memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM, or other optical media can be provided. In such instances, each can be connected to bus 316 by one or more data media interfaces. As will be further depicted and described below, memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external device(s) 312, such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interface(s) 320. Still yet, computer system 310 can communicate with one or more networks, such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for standardized layout transformations of bi-directional (BIDI) data exchanged between legacy and modern systems, the method comprising:

retrieving, by one or more computer processors, client connection information from a client request for data;

determining, by the one or more computer processors, based, at least in part, on the client connection information, an operating system of a client application, wherein the determination indicates whether the operating system is a modern operating system;

determining, by the one or more computer processors, whether the data requested in the client request is BIDI data, wherein determining includes identifying the data requested and determining whether the data requested exhibits one or more bi-directional properties that indicate BIDI data;

determining, by the one or more computer processors, the data requested is BIDI data where the data requested exhibits layout properties indicative of BIDI data;

responsive to a determination that the data requested is BIDI data, initiating, by the one or more computer processors, a layout transformation of the data requested at a single point within a database server, wherein initiating includes determining a plurality of data from a connection string of the client request, where the plurality of data indicates a type of bi-directional data transformation for converting the BIDI data into a layout compatible with the operating system of the client application;

responsive to the plurality of data from the connection string indicating the BIDI data is being returned to the client application from a database, converting, by the one or more computer processors, visual data to logical data within the database server; and returning, by the one or more computer processors, converted BIDI data to the client application.

* * * * *